United States Patent [19]

Edgar

[11] Patent Number: 5,617,116
[45] Date of Patent: Apr. 1, 1997

[54] SYSTEM AND METHOD FOR SACRIFICIAL COLOR MATCHING USING BIAS

[75] Inventor: Albert D. Edgar, Travis, Tex.

[73] Assignee: International Business Machines Corporation, Armonk, N.Y.

[21] Appl. No.: 358,227

[22] Filed: Dec. 16, 1994

[51] Int. Cl.$^6$ .................................................. G09G 5/02
[52] U.S. Cl. .......................................... 345/150; 345/154
[58] Field of Search ...................................... 345/150, 153, 345/154, 199, 186, 149; 358/518, 523, 350, 332, 532; 355/20, 68, 77

[56] References Cited

U.S. PATENT DOCUMENTS

| | | |
|---|---|---|
| 4,676,628 | 6/1987 | Asbury, III . |
| 4,870,480 | 9/1989 | Chao . |
| 4,939,581 | 7/1990 | Shalit . |
| 4,992,862 | 2/1991 | Gabor . |
| 5,012,333 | 4/1991 | Lee et al. . |
| 5,016,191 | 5/1991 | Radochonski ........................ 345/149 |
| 5,018,085 | 5/1991 | Smith, Jr. . |
| 5,155,586 | 10/1992 | Levy et al. . |
| 5,172,224 | 12/1992 | Collette et al. ....................... 358/515 |
| 5,283,671 | 2/1994 | Stewart et al. ....................... 358/532 |
| 5,438,341 | 8/1995 | Kobayashi et al. ................... 345/153 |
| 5,452,018 | 9/1995 | Capitant et al. ....................... 358/520 |

*Primary Examiner*—Chanh Nguyen
*Attorney, Agent, or Firm*—Robert M. Carwell

[57] ABSTRACT

A system and method for previsualizing print images interactively on a computer display simulating appearance of the printed image. Quality of the display is sacrificed to the level of a printed image by adding a linear offset to the brightness of each pixel on the display to match the flare of the print, and thereby simulate appearance of a print. By selectively removing this flare from one or two of the primary colors of a pixel, the illusion is presented of a color with higher saturation than normally produced with the phosphors of the display. These expanded colors match colors possible in a print image but not previously possible in a display image. Image appearance in the two different media are further matched by adjusting the gamma of one to match equal marginally perceptible steps of gray across the grayscale individually for each of the three types of color sensors in the retina, accounting for color crossover in the sensors.

18 Claims, 5 Drawing Sheets

SYSTEM AND METHOD FOR SACRIFICIAL COLOR MATCHING USING BIAS

TECHNICAL FIELD

The present invention relates to a color printing system and method for video color proofing and editing of color prints prior to printing, and more particularly to systems and methods for representing on a color monitor screen a visual match to an image output on a color printer.

BACKGROUND OF THE INVENTION

When creating and editing computerized images for eventual color printing, a need commonly arises to view the images on an interactive computer display. The interactive display gives the fast response desired for artistic creation, and does not use expensive materials to produce intermediate images to monitor the progression of the creation or editing process. When used in this way, it is desired that the computer display give as accurate a representation as possible to the eventual printed image. This accurate representation has been very difficult because the display and a reflection print are very different media. The display, for example, can reproduce brighter blues and can reproduce a more brilliant image because the display is self luminescent. On the other hand, depending on the materials used, the reflection print can, for example, reproduce deeper reds and aquamarine colors. An image artistically tuned to the strengths of a computer display may not convey the same impact as one tuned to the strengths of a reflection print.

A common approach in the prior art has been to make a "proof", or intermediate test print, at each stage of the process. When used in this way, the artist works creatively from the most recent proof, using the display only to represent changes in a way that the artist's mind is constantly translating back to the proof. There are also different levels of proofs. First quick proofs are made with an ink jet or other inexpensive printer in "proof" mode, then a higher quality proof is made with a slower and more expensive process, such as a dye sublimation printer. Finally, if the image is to be published, a very expensive proof is made using the lithographic system and actual inks with which the final product will be produced. The time and expense of making proofs has always been a major problem to the industry and an impediment to creative freedom of artists.

Accordingly the industry has made efforts to match the image on a computer display with that of the final printed product. Early efforts attempted to achieve a technical match between the measured colors on the display with the measured colors on the print. Because the display is self luminescent and the print is reflective, the two media gave a substantially different artistic feel even when a calibrated meter measured the same numerical color. Further attempts modified the colors by empirically tuning to try to approach the feel of the printed page on the display.

Ultimately all the attempts were limited by differing color gamuts of the display and print media. Color gamut of a media refers to the range of colors the media can reproduce. For example, the color bright spectral blue is within the gamut of the CRT displays, but beyond the gamut of reflection inks which are not very efficient at producing a bright pure blue. The prior art solution in this case was to prevent the display from showing the bright blue color so as to match the limited palette of the print. The problem with this approach is that deep colors, like dark, highly saturated red, yellow, and especially emerald green, can be reproduced with inks but cannot be duplicated on a display. The prior art solution could do nothing besides leaving out those colors also. The result was that the artist was forced to design a medium that was really the worst case of both the display and the final print. The artist either had to have a good imagination of what the final print would look like or choose not to use the print material to its full saturated potential. In addition, the displayed image tended to look "clearer" than the final print because the self luminescent display could show a better distinction among all steps in the gray scale.

As the world moves toward desktop publishing of image-based communication by non-image professionals, the use of expensive and time consuming proofing and skill development to work with the prior art is becoming a serious limit to the advancement of the industry.

With the foregoing in mind, it is readily apparent that an improved system and method were needed to closely replicate all of the available colors and feel of a color printing process on an interactive computer display. In this manner, an editor or artist could work interactively with the image in the computer domain until satisfied that the desired emotional effect had been produced, with the assurance that the image on the screen, by application of the teachings of the invention, would accurately be rendered by the printing process, and furthermore that the full advantages of the printing process colors were included in the interactive creative process.

SUMMARY OF THE INVENTION

In accordance with the preferred embodiment of the invention, there is provided a display system wherein the grayscale quality is limited to, that of the printed output that is being matched. The quality is limited by adding a linear offset to the brightness of each pixel of the display so as to force the self luminescent display to match the flair observed by the human eye in a corresponding print. The amount of offset is chosen to limit the display to showing the same limited distinction among the steps in the gray scale as does the corresponding print. Because this step limits the available quality of the display to that of the print in this aspect, it can be said that the quality of the display has been "sacrificed" to match the feel of the print.

Because of this sacrificial offset wherein working black is defined as grayscale brightness above zero, it is possible when needed to display a negative relative brightness by physically displaying a brightness less than that defined to be working black. When this negative brightness is applied to one or two of the three colors, a relative color can be displayed that is outside the normal gamut of the display. For example, let colors be described by a triplet of numbers representing blue, green, and red. Let black be (0.0 0.0 0.0) and let white be (1.0 1.0 1.0). In the color space of the CRT phosphors, a cyan ink may be capable of the color (0.3 0.3 -0.1). Normally the negative brightness of the red cannot be displayed and the prior art would truncate this color to (0.3 0.3 0.0). If an artist chose this truncated color as the brightest available, the prior art would next seek to match that during printing, and would not print the pure cyan. In the present invention, working black is defined, with a flair offset, for example (0.1 0.1 0.1). Relative to working black the dye color now is offset by 0.1 to become (0.4 0.4 0.0), which is displayable. The human eye, referring to the image to working black, sees the illusion of a cyan that is more saturated than that of the normal display gamut. An artist, looking for the brightest color, selects this more exciting color that represents a saturated cyan when printed.

Further aspects of the invention distribute the grayscale and color steps between white and black in a manner that visually matches the print medium. The invention provides a method for adjusting this distribution depending on the surroundings of the display and how the print will ultimately be viewed. The invention does this by remapping the colors to a linear lumen space, adding flair as introduced by the human eye and color crosstalk as experienced by the overlapping spectral responses of the sensors in the human eye, and then remapping this corrected color back to visually uniform space.

Accordingly, it is an object of the invention to provide a display system that can match the look and artistic feel of a corresponding printed image.

It is a further object of the invention to provide a display that can display what is perceived by the human eye to be the full color gamut of the corresponding printed image, including colors technically outside the color gamut of the display.

It is another object of the invention to provide a method of adjusting the displayed image to match the corresponding printed image viewed under a range of conditions.

The invention contemplates other objects, features, and advantages, which will become more fully apparent from the following detailed description take in conjunction with the accompanying drawings wherein:

DETAILED DESCRIPTION OF THE PREFERRED EMBODIMENT

In order to understand how the subject invention overcomes the serious deficiencies hereinbefore described, the concept of gray steps and middle gray must be understood. Initially a simplifying assumption will be made with reference to FIG. 1 that images are not colored, e.g. they are comprised of black, white, and gray steps therebetween. The effects of color will be added later in the description.

Figure 1:
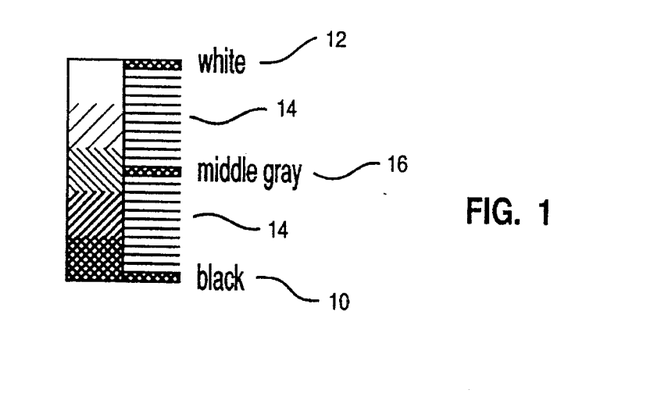
FIG. 1 is an illustration, of multiple shades of gray or "gray steps" as distinguishable by human perception, and of black, white, and middle gray.

In order to illustrate the concept, it may be assumed that an observer may select for a given image or set of images a darkest shade thereof to correspond to black 10 and a lightest shade designated as white 12. Normally the black 10 and white 12 will correspond to the darkest and lightest shades of which a given medium is capable. In the case of a photographic print, for example, black 10 may correspond to 1% reflectance, which is perceived as pure black, and white 12 to 90% reflectance, which is perceived as pure white. Between black 10 and white 12 are various shades of gray 14. One of these shades of gray is middle gray 16. A question arises as to which shade of gray is middle gray. For the purposes of this invention middle gray will be taken as that gray for which half the perceived shades of gray are darker and half are lighter.

That raises a more difficult question as to how many shades of gray are perceived and how they are distributed across the grayscale. For the purposes of this invention, it is defined that there are as many shades of gray as may be distinguished by perception of the human eye, and it follows that middle gray 16 may therefore be defined as that shade for which half of the distinguished shades of gray 14 are above and half below the thus designated middle gray 16.

As is well known in the art, the limit to such distinguishing shades of gray 14 is noise. The eye must be content with such noise caused by the photon nature of light, flare in the lens and eyeball, neural limits, and the like. If two shades of gray differ by more than such noise, the eye is able to distinguish between them.

FIG. 1 introduced the concept of shades of gray and a middle gray. These were plotted in perceived space, and so are uniformly spaced. Next, this perceived space will be mapped to a linear lumen space that can be measured with an instrument. Such a mapping is extremely important because it will show how to process a measured brightness of a pixel into how the pixel is perceived. The shape of this mapping varies according to the conditions under which the shades of gray are viewed. The description will now cover three cases of mapping under normal light, under poor light, and under bright light.

Continuing with the background description of gray steps and middle gray applied to the case of normal lighting, it has been shown that modeling the retina of the human eye as a photon counter is a very good assumption for present purposes. A photon counter measure light by counting the random arrival of photons. Twice the number of photons represents twice the light. Twice the number of photons in the same span of time means the light is twice as bright, and has twice as many lumens. The counting process is well defined as a statistical process. According to common statistics theory, for a photon counter, the percentage difference in brightness between just perceptible shades of gray varies inversely with the square root of the brightness of those two steps. As an example, if two shades of gray that differ by 10% can be distinguished by measuring 100 photons, then by measuring 400 photons, e.g. 4 times the brightness, two shades of gray can be distinguished that differ by only 5%, e.g. the gray steps are twice as close as a percentage difference.

In making such an observation, an important point must be noted. In, for example, 100 lumen light, a human observer may be able to distinguish a change of 1%, e.g. a 1 lumen difference. However, in 400 lumen light, that same observer may be able to distinguish a change of 0.5%, e.g. a smaller percentage change. However, inasmuch as 0.5% of 400 lumens is 2 lumens, this is a larger absolute change. The smaller percentage noise in the foregoing example shows that an observer, as is well known, sees better in brighter light. However, the larger absolute noise means that a fixed addition of light, such as for example from a flashlight beam, is harder to perceive in that brighter light than in dim light. Furthermore, the assumption that the retina is a photon counter does not take into account the throttling effect of the iris of the eye. For the purposes of this invention which considers pixels of different brightness within an image, the effect of iris variations can be ignored because all pixels of the one image are viewed at once through the same iris, be it large or small.

Figure 2:
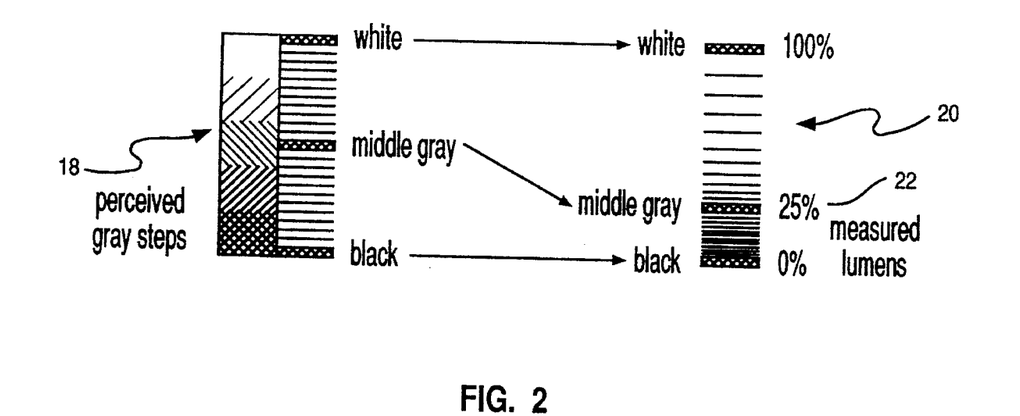
FIG. 2 is an illustration of the mapping of perceived steps of the gray map of FIG. 1 to equal step sizes plotted as the square root of luminance whereby middle gray is at 25% of the lumens between black and white.

Continuing with the analogy of human perception and the eye to a photon counter, in a conventional photon counter and in the present model of the retina of the eye under discussion, lumen measurements correspond to the square of a linear gray step measurement, in other words, the perceived just distinguishable steps of gray map to equal step sizes on a graph which plots the square root or luminance. This in fact models very closely to empirical measurements of the way in which the human retina perceives the separation and middle point of gray shades. Turning to FIG. 2, these perceived gray steps 18 are depicted therein mapped to actual measured lumens wherein steps lie on the lumen graph at a level proportional to the square of the number of the gray step above black. By taking the number of lumens for a particular step and then taking the square root of that number of lumens, a number proportional to the number of the gray step above black is again obtained. From FIG. 2, then, it will be noted that the middle gray in the perceived gray steps 18 corresponds to a middle gray 22 at 25% of the lumens of the difference between white and black measured in lumens, To summarize discussion to this point, to convert lumens to gray steps, the square root of lumens is taken. To convert gray steps to lumens, the number of the gray steps is squared. A square is a power of two. This case may be defined as having a power, or "gamma" to use a photographic term, of 2. We will call this the "conversion gamma" because it is the exponential power to convert perceived gray steps to lumens. Next, two other cases will now be considered where the conversion gamma is below and above 2.

With the foregoing in mind, the effect of adding a constant light to each pixel must be considered. This additional constant light is well known in the art and is referred to as "fog" or "flare" in photography, or "background count" with respect to the aforementioned photon counters. It is generally the result of poor lighting and caused by background neural and thermal noise in the retina at low light levels. It is also caused by flare in the eye lens when the observer is looking into light, the scattering of light inside the eyeball as a result of age, and the flare off the object being viewed itself due to bad lighting angles, glass covering the image, or the like. The extent of this flare under normal office light may be demonstrated to a human observer by cupping hands over the eyes to form a tunnel shading the eyes, and noting the improvement in shadow detail when viewed through the open end of the tunnel. Even though, in keeping with the photon counter model, the retina sensors may still be responding statistically as such a photon counter, the addition of this fog raises the level of black well above zero lumens and essentially compresses the gray scale to a more linear segment of the non-linear perception curve.

Figure 3:
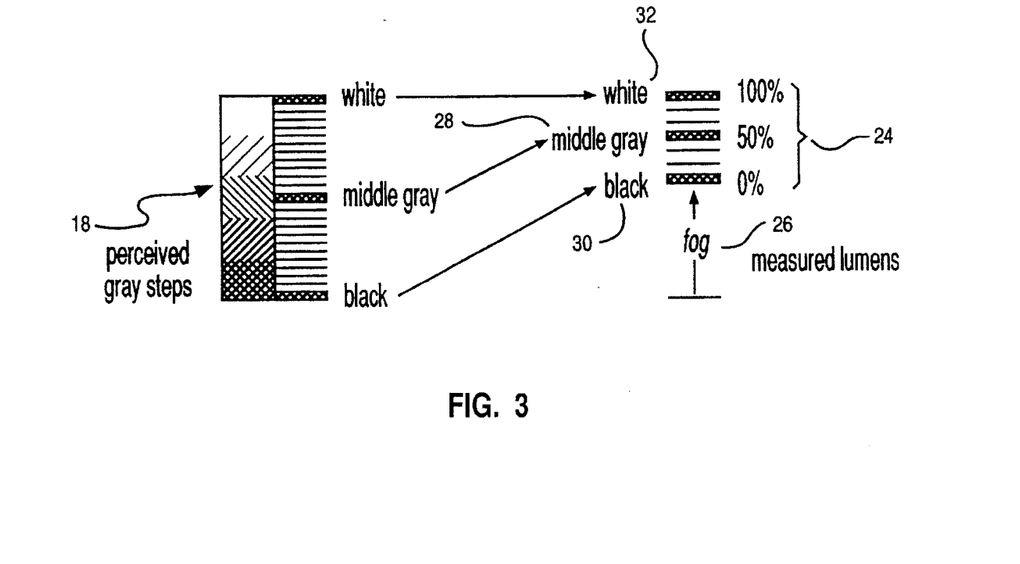
FIG. 3 is an illustration of the compression of the gray scale by fog to a linear segment of the non linear plot of FIG. 2 whereby middle gray approaches 50% of the lumens between black and white.

Turning to FIG. 3, this effect may be seen graphically illustrated therein. Once again on the left hand portion of the figure, perceived gray steps 18 are shown. As just noted, under poor lighting conditions of as a result of the other aforementioned causes, such perceived gray steps of the gray scale may be perceived to have been compressed to a linear segment 24 when measured by lumens, such effect being caused by the presence of fog 26 as just noted. Accordingly, the middle gray 28, measured in lumens, approaches 50% of the lumens between black 30 and white 32.

To summarize the case of high flare just presented, the middle gray step rises from 25% of the way between black and white and approaches 50%. At 50%, there is an essentially linear relationship between perceived gray steps and lumens, so one is related to the other raised to the unity power. Expressed in gamma, the conversion gamma is 1. It should be noted that a gamma of 1 is the extreme case that is approached but not normally reached. A reflection print has surface reflection and is normally no brighter than its surroundings, so is more subject to flare than other media. A photographic print might typically exhibit a conversion gamma between measured lumens and perceived gray steps of 1.8. However, if this print is mounted on a white board which causes more flare in the eye, and placed behind glass, which adds additional reflection, the conversion gamma may typically be 1.6. Note also in FIG. 3 that flare reduces the total number of perceived gray steps between black and white.

Figure 4:
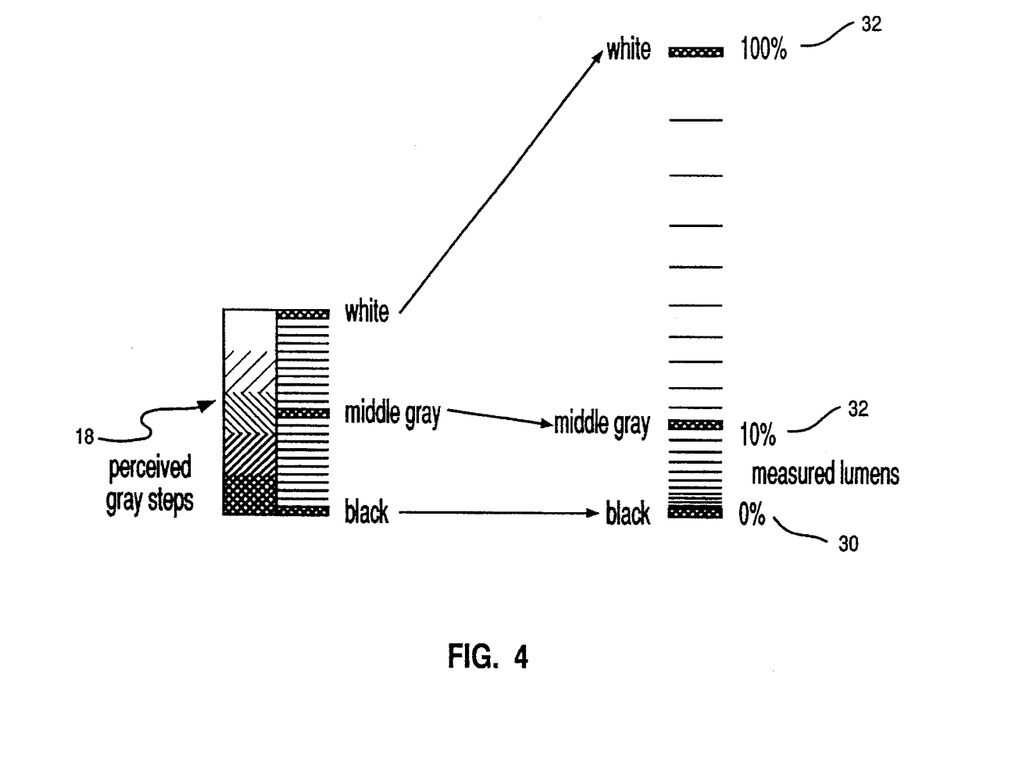
FIG. 4 illustrates how, under bright light, human perceived steps of gray map to equal step sizes on a logarithmic graph of luminance, whereby the middle gray step is below 25% of the lumens between black and white.

Now that the perception model has been discussed with respect to gray steps, middle gray, and the first case of normal lighting and second case of high middle gray (e.g. dim light or high flare), yet a third case resulting in a low middle gray under brilliant lighting must further be considered. This is essentially an opposite case to that of the high middle gray, wherein there is now such a high level of light that the statistical noise of photon counting is less than the fixed percentage noise of the neural processing. In such a case, the perceived gray steps map to equal step sizes on a graph plotting the logarithm of luminance, as shown in FIG. 4. Thereby, the steps are spread in the highlights even further than would be the case for the aforementioned square root graph depicted in FIG. 2. This, therefore, causes the middle gray 32, measured in lumens, to drop from that depicted in FIG. 3 below the 25% expected in a photon counter. Under extreme light conditions, the retina of the observer may begin to saturate whereby distinguishable highlight steps are spread further still, although this condition is usually avoided for comfort and safety by employing sunglasses under extremely bright light.

In summary of the foregoing, under bright light and under conditions with no flare such as observed with a self luminescent image in a darker room such as a cathode ray tube (CRT) computer display or projected slide, the conversion gamma rises above 2. For example, a CRT viewed in a dim room may exhibit a middle gray of 18% and therefore the conversion gamma may be typically 2.5. Also, the world viewed under bright sunlight will exhibit such an 18% middle gray, as is well known to photographers. Note also that under these conditions the total number of perceived gray steps increases. A CRT viewed in a dim room displays more steps of gray than a photographic print mounted on a white board and protected under glass. The result is that the CRT image will look "clearer", even when all the other variables are normalized to make the two media appear to have matched color and contrast. This perceived clarity in the display image is undesirable if the intent is to match the look and feel of a final printed image. In the present invention, this clarity will be sacrificed to make the display equal to the print in quality. Quality will be sacrificed in a way that will enable the illusion of undisplayable colors to appear on the display, thus completing the illusion of the printed page on the computer display. These steps will be explained in further detail.

It will be recalled that the foregoing discussion related only to the monochromatic case. The case is now extended from gray steps to full color steps. To accomplish this extensions, we will make use of the fact that each type of color sensor in the eye sees only a gray scale. Color is perceived as a difference in the level of gray seen by them different sensors of differing color insensitivities. Now the purpose of the foregoing discussion will become clear as a new explanation of color mixing in the sensors is provided. Based on this theory, new methods of handling color not known in the prior art will become apparent that form a basis of the present invention The just described photon counter nature of the human retina applied to the lumens which are physically stimulating the individual color sensors in the retina of the observer. It has been found that these sensors have very broad spectral sensitivity curves which allow for a great deal of color overlap. This overlap in effect "fogs" one color with another. Using the present photon counter model of the eye, a green sensor, for example, may be able to distinguish very fine gray steps in the dark part of the green grayscale when green is the only part of the spectrum available to stimulate the retina, however, the same green sensor cannot distinguish fine gray steps in the dark part of the green grayscale in the presence of a large amount of red light which crosses over to "fog" the green sensor, because the green sensor is also partially sensitive to red light.

The foregoing will be stated again using a numerical example for clarity. In a pure grayscale, the eye substantially distinguishes 0% lumens from 1% lumens as clearly as it might 80% lumens from 100% lumens, based on a conversion gamma of 2 as defined earlier. However, if red in the pixel of an image is maintained at 100% lumens, as in the example of the foregoing, the eye will not be able to distinguish 0% green lumens from 1% green lumens because the red color essentially fogs the green sensors in the retina. If it is assumed that the green sensors are asked to distinguish between 50% actual lumens total stimulating the sensor (0% green times 100% sensitivity plus 100% red time 50% sensitivity) and 51% lumens (1% green times 100% sensitivity plus 100% red times 50% sensitivity), assuming again a conversion gamma of 2, the difference between this actual difference is 14 times less than the difference between 0% and 1%, and therefore the difference is not visible.

This foregoing simple physical model describes surprisingly well how colors are visualized by a human observer. For example, if a palette is constructed utilizing a visually uniform gray scale applied separately and independently to red, green, and blue, as is commonly done, there will be several nearly saturated colors which appear to the human eye virtually identical. On the other hand, the steps will appear too large between pastels, which results from the wasted states taken up in the palette by the redundant saturated colors. This is explained by noting that according to the present model the eye cannot distinguish small steps in the dark end of the gray scale of one color if another color has a high intensity, as it occurs in nearly saturated colors.

As a further example of a phenomenon explained by the present invention, consider projected photographic slides as compared to a reflection print. The projected slide exhibits the lower middle gray previously discussed, which requires a higher contrast, or photographic gamma, to maintain a visually equal gray scale. A typical slide has a gamma referenced to real life of 2, while a typical print has a gamma referenced to real life of about 1.2. (This gamma is the power to which real life lumens are raised to match the lumens from the reproduced image,, it is not the conversion gamma defined earlier which is the power to which a gray level in visually uniform space is raised to match the measured lumens from the reproduced image). However, because of the previously discussed phenomenon of "fogging" at the retina by one color over another, the boost in low light gray step sensitivity of the eye in the case of such slides does not follow as much in the color channels as in the luminance. As a result, in the slide medium, by correcting for the gray scale, color is typically overcorrected—this explaining why color often appears brighter in slides than in prints.

An example will now be provided for converting colors on one medium to a second medium by equalizing gray steps as explained previously. This specific example in reference to FIG. 5 converts from a CRT display viewed in a darkened room to a reflection print for display behind glass, In this example the colors will be chosen within the palettes of both media that give the clearest image in the target medium, that is, all available gray steps will be used. This will map the "best" image in the display space to the "best" image in the print space. This type of mapping is important where the output media will be the final product, so what is desired is not an exact match, but the best possible image that, if possible, takes advantage of the strengths of the output medium. This example does not use sacrificial matching.

Figure 5:
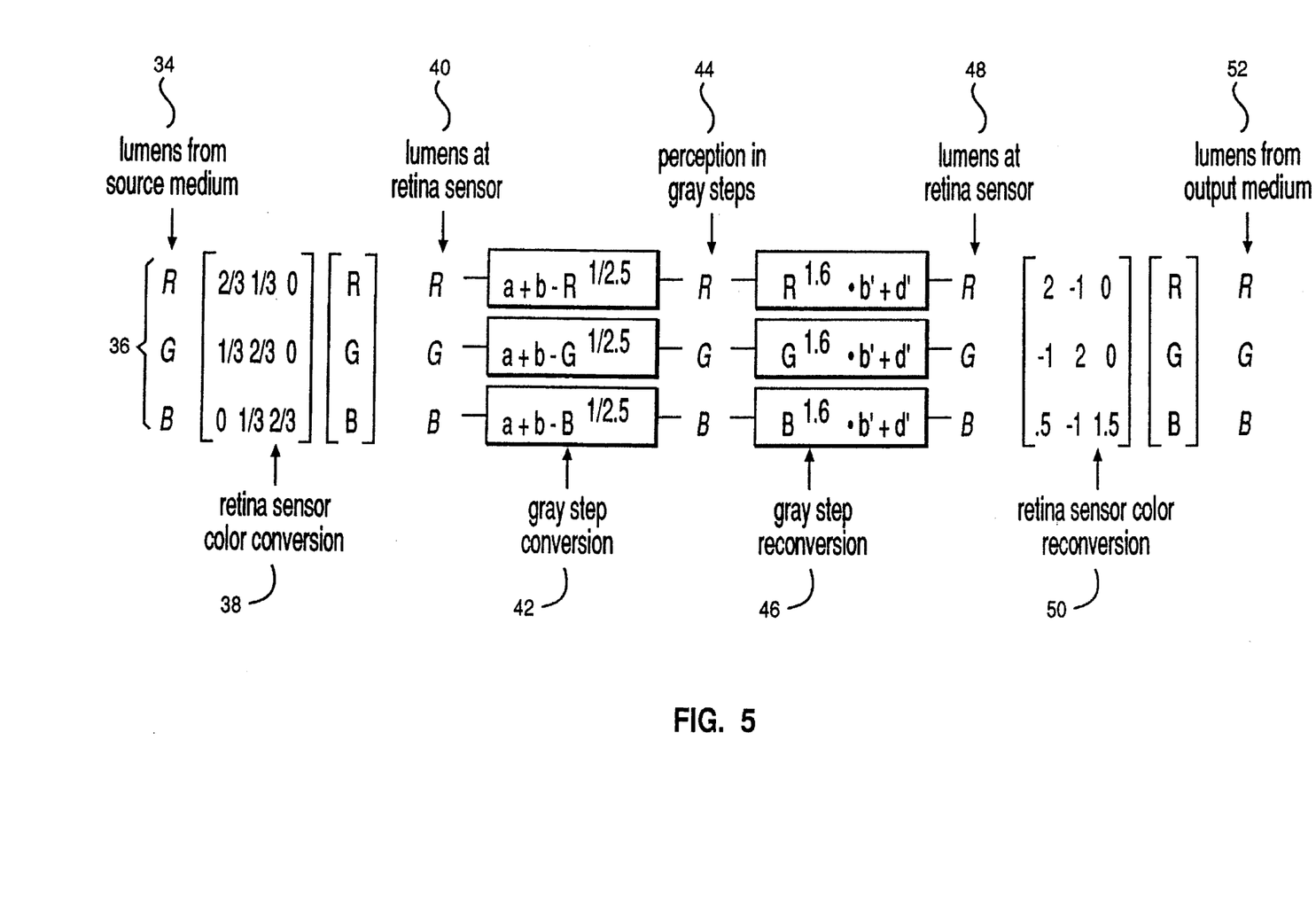
FIG. 5 is an illustration in accordance with the invention of the conversion of lumens from a source medium of a computer display to lumens from an output medium corresponding to a color gallery print.

Continuing now with FIG. 5, the lumens from the source medium 34, in this case the display image, are measured for each pixel of the image. These lumens are expressed as three numbers representing red, green, and blue, or R, G, and B values 34. These are expressed in any chosen color space, such as standard chromaticity coordinates or phosphor R, G, B values. However, they are measured linearly, so that twice the magnitude represents twice the light. If they are measured by a photometer, they will normally be in linear space, but if they are measured indirectly by the numbers applied to a linear digital to analog converter driving a CRT, they must be converted to the linear domain by applying the inverse of the gamma of the CRT, typically by squaring the aforementioned number presented to the digital to analog converter. Next, a matrix 38 is applied to perform color conversion from the first color space to the color space representing light actually seen by the individual sensors in the retina. The exact numbers depend on the chosen first color space. The numbers shown in FIG. 5 represent crosstalk from green to red and blue, and from red to green, and work as a good approximation for a first color space representing R, G, B phosphor color values. The output values of this step represent actual lumens at the retina sensors 40, If displayed directly, these values would produce an image with very muddy colors. Next, the R, G, B values at the retina sensor 40 are converted to gray steps 44 linearly spaced in perception space. This is done according to the invention by taking the inverse of the conversion gamma of the source medium, 2.5 in the present example.

The perception graystep R, G, B values 44 represent the common denominator that can describe all images from all media in the form in Which they are physically perceived by the retinal Sensors. Continuing with FIG. 5, these values will be mapped to lumens required to be measured from the output media. The driver to the output media can then be technically adjusted to match these values. First, the perception in gray step values 44 are converted to lumens that must be presented to the retina sensors 48 by applying the conversion gamma of the output media, 1.6 in the present example of a print displayed under glass, in the gray step reconversion step 46. Note that lumens at the retina sensors from the source image 40 are different from lumens at the retina sensors from the output image 48. According to the theory explained above, these must be different to give the same visual perceived effect. This Step is where many prior art systems have given disappointing results by attempting to match images technically rather than as perceived.

Finally, these desired lumens at the retina sensor 48 are converted to desired lumens from the output media 52 by applying the correcting color matrix in the retina sensor color reconversion step 50. The matrix in step 50 is the inverse of the matrix in step 38 if the color space used to express the lumens from the source medium 34 is the same as the color space used to express the lumens from the output medium 52. If they are different color spaces, the matrix in step 50 will be the inverse of the matrix in step 38 times the necessary conversion from the color space of 34 to the color space of 52. The lumens from the output medium. 52 now are the technical aim values to which the output medium can be calibrated to produce using a meter. Again a point is made for emphasis. The lumens from the output medium 52 differ from the lumens from the source medium 34, however the visual illusion will be of a good match between two images reproduced on the two mediums. In this particular case used as an example, the gamma, or contrast will have decreased to squeeze gray steps into a more limited grayscale budget of a print, however the color intensity will have increased relative to the lower contrast.

The gray step conversion step 42 and reconversion step 46 may be further extended to include, not just raising to a power as discussed so far in reference to FIG. 5, but also, for the reasons presented earlier, the addition of an offset and gain constant. The offset is chosen so the blackset step of lumens from the source medium and the output medium map through a gray step of zero, and the brightest step of lumens in both map through a gray step of 1.0. As explained earlier, this would make the darkest shade of a printed image map to the perceived black gray step, even through flare prevents the attainment of zero lumens. Referring specifically to FIG. 5, the constants "a" and "b" in the gray step conversion 42 represent the offset and gain of the source medium, where normally "a" has a negative value, and the constants "A'" and "b'" represent the offset and gain of the output medium.

So far the method of FIG. 5 has described how to translate a pixel from one medium into the illusion of another medium. By repeating the process for each pixel of an image, the entire image is translated.

The method of FIG. 5 described so far utilizes the full gray scale of each medium, so if one medium is inherently "clearer" than another, with more gray steps, this clarity will be retained through the mapping. This case has many applications where a user is translating from one medium to another with the intent of the image looking best in each medium while still looking as similar as possible within that constraint.

A second case will now be presented that slaves an output medium to a source medium, with the expressed intent that the output medium look as close as possible to the source medium, and in particular look no clearer, even though the output medium is inherently capable of looking clearer. We will describe the output medium as being "sacrificed" to the source medium, and call such a method "sacrificial color matching". This case is of particular interest where the public will see the source medium, but only the artist will see the output medium, and is using the output medium only as a proofing tool to check how the source medium will appear. As a specific example, the source median may by the cyan-magenta-yellow-black (CMYK) ink values that will be used to print an image in a magazine. These CMYK values are translated to expected lumens from the source medium 34 in FIG. 5 using well established techniques, and using the teachings just presented relative to FIG. 5 are translated to aim lumens from output medium 52, where the output medium is chosen to be a CRT. These aim lumens are then translated into drive numbers into the pixels of a CRT display system using commonly available techniques, e.g. color space translation and gamma correction. It should be understood that the numbers in the specific example of FIG. 5 would also change to match the color characteristics and the conversion gammas of the different source and output media.

In the case just discussed with a print source medium and a CRT output medium, the output medium will exhibit more gray steps than the source medium. It is the expressed intent to reduce the number of perceived gray steps on the output medium to match the source medium so the clarity of the output image is no better than the quality of the source image. It is a key feature of the present invention that this limiting of perceived gray steps be accomplished by adding a constant to the value of the pixels in the output image, that is by increasing the value of the constant "a'" in step 46 of FIG. 5. Changing this offset may also require the obvious small modifications to the gain "b'" and the translation gamma, as presented earlier, to keep the middle gray step in the perceived middle.

The addition of this offset in effect "fogs" the CRT display by raising black higher than the darkest black of which the CRT is capable. This actually matches the flare and glare off of a reflection print, attaining the stated goal of making the CRT image have the same look and feel as the printed image. For a reflection document the amount of fog depends on peripheral lighting, illumination angle, and peripheral reflection off white surroundings that cause flare inside the eyeball, but a fog level of 870 of reference white is typical at the retina. On the other hand, for a computer display in a dimmed room, a fog level of 270 is typical. The difference of 670 is the amount of bias to be added in order to "sacrifice" the output medium. Note that because a CRT outputs lumens proportional roughly to the square of the brightness control number stored for each pixel, if the system is tuned so a control number of "0" maps to pure black and "255" to pure white then 6% of white lumens is produced with a control number "62", a rather substantial offset.

Next, a very useful feature of this offset is described. To understand this feature, it is necessary to understand color gamuts. No medium can display all colors that the eye is capable of perceiving. A color gamut for a particular medium is the range of colors that the medium is capable of displaying. Different mediums have different color gamuts, which creates a particular problem for color matching between mediums. Of particular relevance for the current discussion is colors that are in the color gamut of printing inks that are not in the color gamut of a CRT, that is, cannot be reproduced on a CRT.

In general, because the CRT is additive, it is very good at reproducing bright colors. For example, in a CRT, green and red can be turned off while blue is left at full strength for a very bright spectral blue. Inks, on the other hand, are subtractive, and because inks are not perfect, it is impossible to absorb substantial amounts of red and green without also absorbing some blue, in effect turning down the blue. Inks are just not capable of producing very bright and light colors. In the present case, this condition is not a problem, as, when following the teachings of the invention, the CRT will simply not be called on to produce such colors when matching inks.

On the other hand, because inks are subtractive, the addition of more and more ink causes a color to increase in saturation, and although darker, become a very pure color. The CRT, on the other hand, cannot produce colors any purer than the phosphor colors, which in conventional monitors are not very pure. Also, colors composed of two primary colors, such as yellow and cyan, will lie on a line between the two composing primaries, not on the periphery of a circle, so a CRT is particularly weak in presenting these colors. This does present a serious problem in the prior art for the present case of color matching because deep cyans, aquamarines, yellows, and browns that can be printed cannot be presented on a color CRT. If the artist cannot see these colors while creating an image, that artist cannot take advantage of these colors in the creative process.

In the present invention, without sacrificing offset described above, the retina sensor color reconversion step 50 of FIG. 5 would work mathematically for the case of colors outside the gamut Of the CRT by outputting negative values for some of the colors. For example, it might call for the CRT to reproduce blue=0.3, green=0.3 and red=−0.1 in order to match a deep aquamarine. The negative value of red is of course undisplayable, and the mathematics is proving the color is outside the gamut of the CRT. However, if the offset "a'" in step 46 had been 0.1, then the addition of this offset would produce an aim color for the CRT of blue=04, green=0.4 and red=0.0, which is displayable. In effect, the eye is referencing everything to an offset black, perceiving the offset to be common flair that exists So a greater or lesser extent in all viewed images. However, since this offset is controllable, it is possible to display a color, such as red, darker than the offset black, producing the illusion of a deeper aquamarine, matching the ink color.

It should be noted that if each individual row of the conversion matrix in step 50 of FIG. 5 sums to unity, then the constant "a'" can be added either at step 46, or it can be added at output step 52 with no mathematical difference. There are other such expedients that may be applied without departing from the intent of this invention.

A flowchart will now be described with reference to FIG. 6 for taking a cyan-magenta=Yellow (CMY) image and translating it to a red-green-blue (RGB) for display on a CRT using the technique of sacrificial color matching so as to make the CRT image match the printable CMY image in look and feel and color gamut. First, a CMY image 60 is received. This image may also be in the form CMYK. There are two things one can do with this image. One thing using branch 62 is to print it on a CMY or CMYK printer to produce a print 64 that may be viewed by normal reflected light. Using the teachings of this invention, another option is to proceed down branch 66 to eventually produce a matching display image 74. The display image may be seen quickly, inexpensively, and interactively, and is so highly desirable for editing and creation of the image.

Proceeding down branch 66, the first step 68 converts each pixel of the CMY or CMYK image to RGB values using conversion formulae that are well known in the art. The conversion is chosen to output linear values and to output values in the color space of standard CRT color phosphors. With certain values of CMY, this will result in some of the RGB values going negative. Next, step 70 adds an offset, typically 6% of white, individually to each of the R, G, and B values of each pixel. At this point, black will become instead a dark gray and the negative values will become zero or positive. In step 72, these RGB values are converted to the gamma of a display CRT, typically by taking the square root of each of the individual R, G, and B values of each pixel to produce output RGB. Finally, in step 74, the output RGB values of each pixel are applied to a CRT display viewed in dim room. The image of step 74 will match the image produced by the printer in step 64 more closely than was possible in the prior art.

Figure 6:
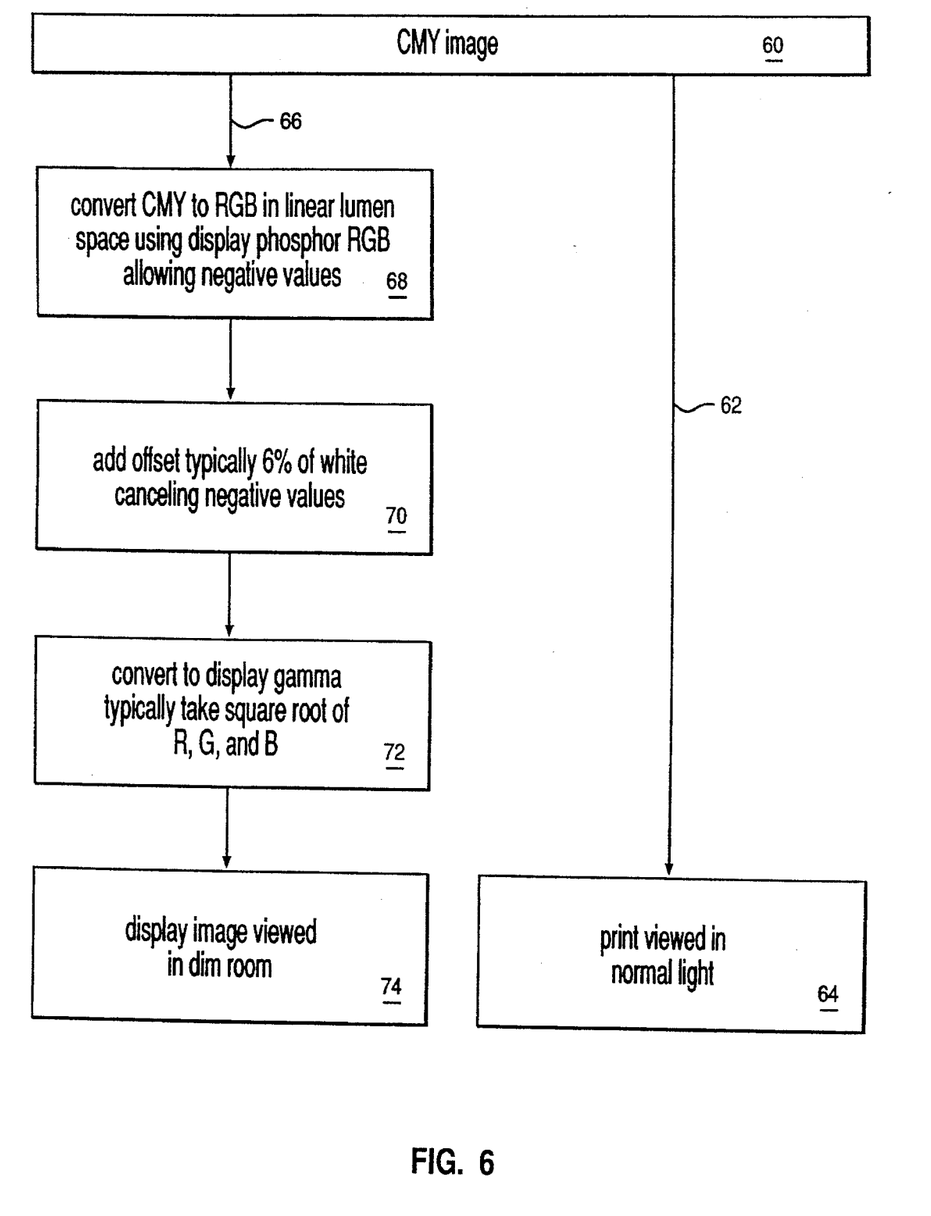
FIG. 6 is a flow diagram for a computer program implementable on the system of FIG. 7 to effect a color computer display image to print in accordance with the invention.

The flowchart of FIG. 6 makes several simplifications over the method of FIG. 5. For example, the graysteps are not explicitly calculated, and therefore the two gamma adjustments of FIG. 5 to get into and out of gray steps are replaced with the single gamma adjustment 72 of FIG. 6, and the two offset adjustments of FIG. 5 are replaced with a single offset addition in step 70 of FIG. 6. While not mathematically identical, the method of FIG. 5 and FIG. 6 produce similar results, and illustrate that variations are possible within the teachings of the invention.

Figure 7:
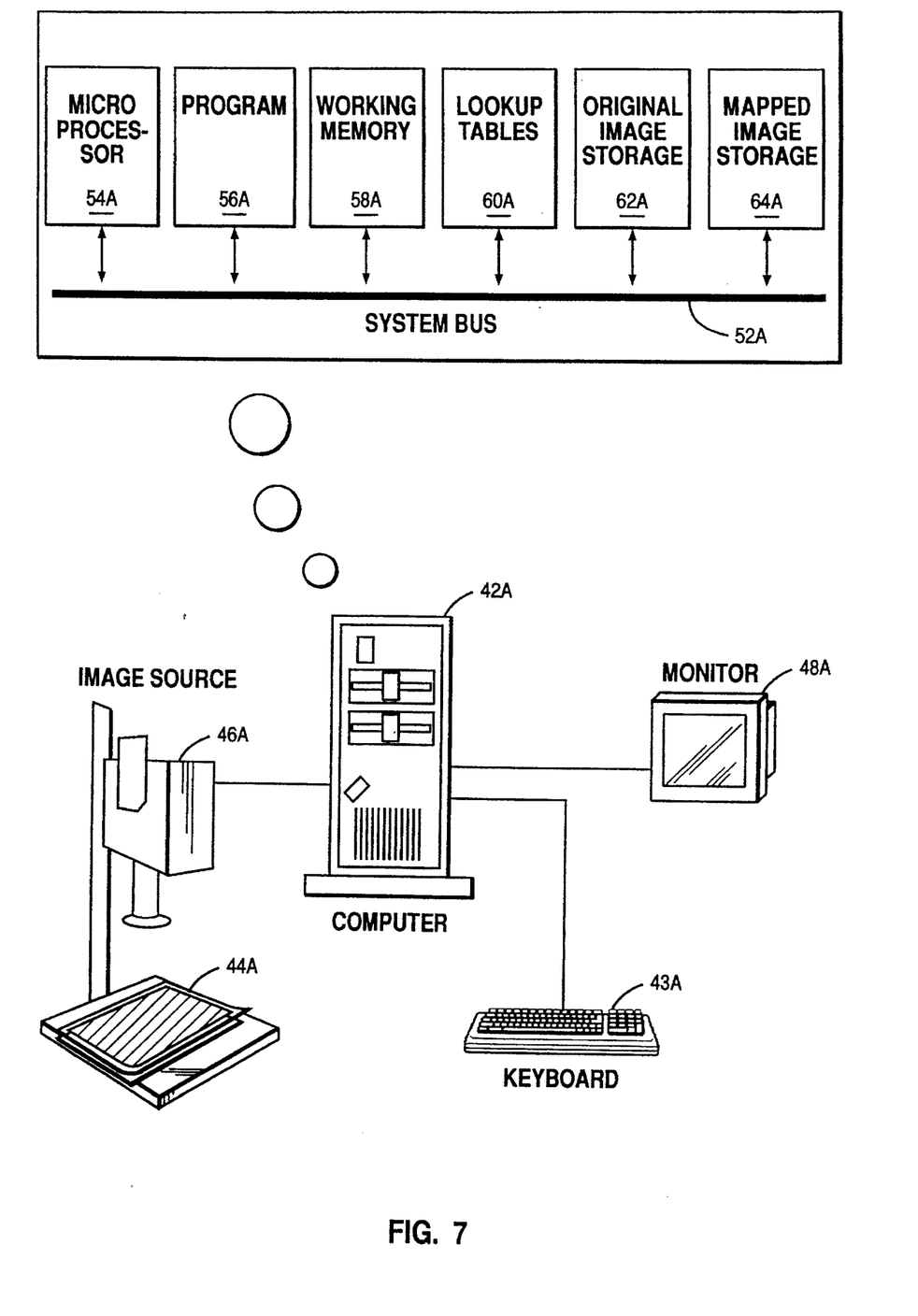
FIG. 7 is a computer system on which the computer program of FIG. 6 may be implemented.

Referring finally to FIG. 7, a typical system providing the environment for implementing the invention may be seen depicted therein. A computer 42A, such as a PS/2 (trademark of the IBM Corporation) personal computer system will execute the steps of the invention with a program loaded therein implementing the processes and methods previously described, including the software flow diagram of FIG. 6. In order to have images to operate upon, the computer may also be used to first capture, by means of an appropriate source, such as a camera 46A, scanner, or via some other medium, an image based upon a source object 44A, which the computer 42A will thence digitize for subsequent processing in a manner well known in the art. The mapped image created in accordance with the invention may be stored for display on a conventional monitor 48A for human observation or otherwise stored on media for eventual display.

A conventional keyboard 43A and other I/O and user interface devices will further be provided to the computer 42A for interacting to effect the invention. Inside the computer 42A, a system bus 52A is provided which ties together the microprocessor 54A, the previously described programs 56A, which instruct the microprocessor 54A how to execute the steps of the invention, and working memory 58A. This memory 58A is utilized by the microprocessor 54A to store intermediate calculations employed in accordance with the method of the invention. Additionally, stored in memory and interconnected to the system bus 52A may be various lookup tables generally represented at reference numeral 60A, the original stored image 62A captured by the camera 46A and a mapped image 64A as desired which may be generated from the steps described.

While the invention has been shown and described with reference to particular embodiments thereof, it will be understood by those skilled in the art that the foregoing and other changes in form and detail may be made therein without departing from the spirit and scope of the invention.

I claim:

1. A method for use in a computer display system displaying an image on said display system matching a display of said image displayed on a medium comprising:

storing from said image displayed on said medium comprised of a reflection print generating a total flare a plurality of digitized pixels;

adding biasing proportional to said total flare to said pixels including removing a portion of said biasing from selected ones of said pixels;

displaying said image on said display system from said biased pixels, wherein black is displayed as non-zero light, said displaying including displaying negative relative brightness comprised of a brightness less than a working black grayscale brightness above zero in response to said removing a portion of said bias; and extending relative color gamut of said display as a function of said relative negative brightness.

2. The method of claim 1 wherein said pixels are stored in linear lumen space; and wherein said adding biasing is added in said linear lumen space.

3. The method of claim 2 wherein said pixels correspond to values of red, green, and blue.

4. The method of claim 3 wherein said adding biasing comprises adding said biasing to said values.

5. The method of claim 1 wherein said display system and said image displayed on said medium define graysteps; and further wherein said method further includes:

generating a function distributing said graysteps equally; and wherein said adding bias comprises processing said pixels with said function.

6. The method of claim 5 wherein said pixels correspond to values of red, green, and blue.

7. The method of claim 6 wherein said adding bias comprises adding said biasing to said values.

8. The method of claim 7 wherein said display system method defines color space functionally related to retina sensor sensitivity; and wherein said method further includes the step of distributing said graysteps equally in said color space.

9. The method of claim 1 wherein said biasing is a linear offset.

10. A computer display system method for displaying an image on said display system matching a display of said image displayed on a medium comprising:

means for storing from said image displayed on said medium comprised of a reflection print generating a total flare a plurality of digitized pixels;

means for adding biasing proporation to said total flare to said pixels including means for removing a portion of said biasing from selected ones of said pixels;

means for displaying said image on said display system from said biased pixels, wherein black is displayed as non-zero light, said means for displaying including means for displaying negative relative brightness comprised of a brightness less than a working black grayscale brightness above zero in response to said means for removing a portion of said bias; and means for extending relative color gamut of said display as a function of said relative negative brightness.

11. The system of claim 10 wherein said pixels are stored in linear lumen space; and wherein said means for adding biasing adds said biasing in said linear lumen space.

12. The system of claim 11 wherein said pixels correspond to values of red, green, and blue.

13. The system of claim 12 wherein said means for adding biasing includes means for adding said biasing to said values.

14. The system of claim 10 wherein said display system and said image displayed on said medium define graysteps; and further wherein said display system further includes:

means for generating a function distributing said graysteps equally; and wherein said means for adding bias includes means for processing said pixels with said function.

15. The system of claim 14 wherein said pixels correspond to values of red, green, and blue.

16. The system of claim 15 wherein said means for adding bias includes means for adding said biasing to said values.

17. The system of claim 16 wherein said display system defines color space functionally related to retina sensor sensitivity: and wherein said system further includes means for distributing said graysteps equally in said color space.

18. The system of claim 10 wherein said means for adding biasing adds a linear offset.

\* \* \* \* \*